Oct. 13, 1959

O. E. SAARI 2,908,187

REDUCTION GEARING UNIT

Filed May 19, 1955

INVENTOR.
Oliver E. Saari
BY
Olson & Trexler
attys.

Oct. 13, 1959 — O. E. SAARI — 2,908,187
REDUCTION GEARING UNIT
Filed May 19, 1955 — 3 Sheets-Sheet 2

INVENTOR.
Oliver E. Saari
BY Olson & Trexler
Attys.

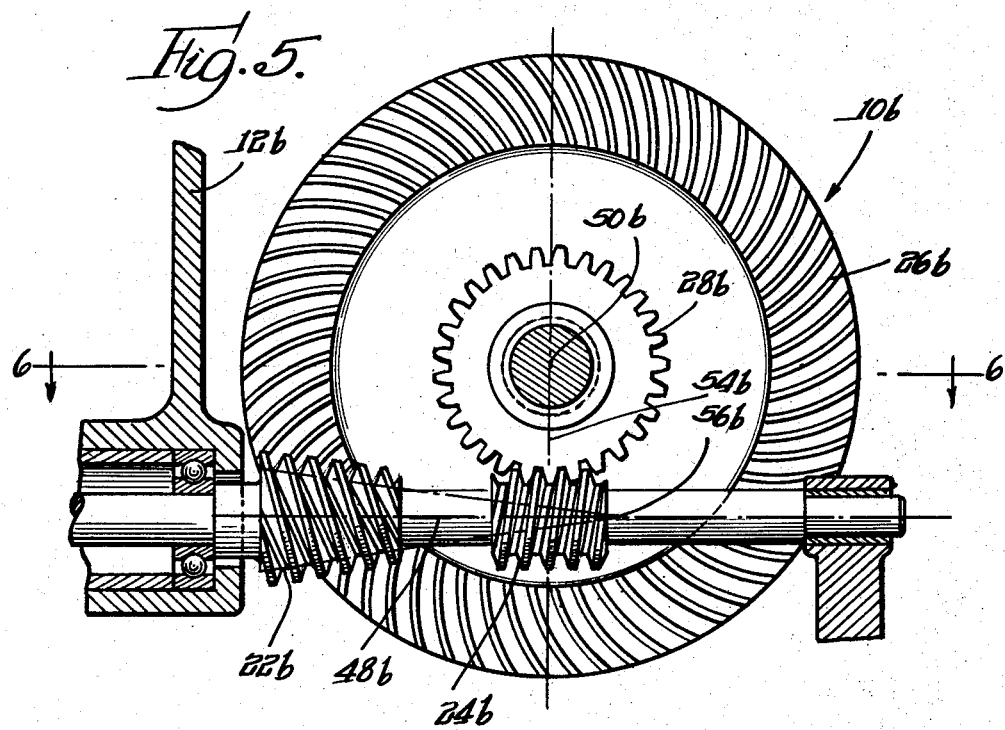
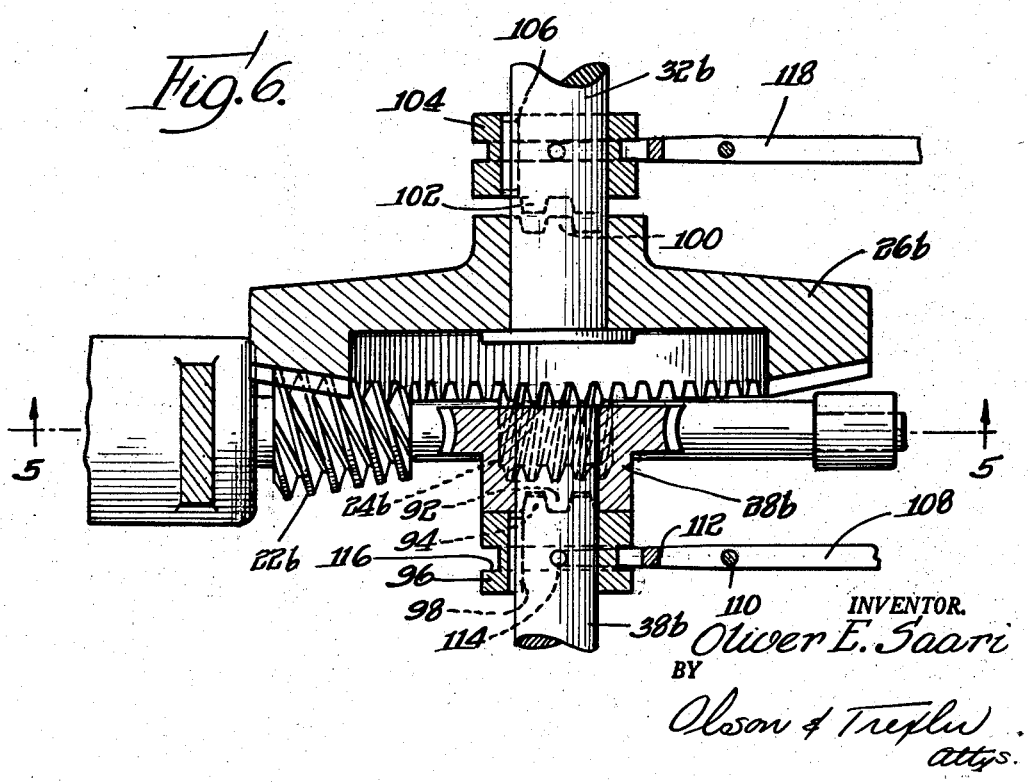

United States Patent Office 2,908,187
Patented Oct. 13, 1959

2,908,187

REDUCTION GEARING UNIT

Oliver E. Saari, Chicago, Ill., assignor to Illinois Tool Works, Chicago, Ill., a corporation of Illinois Application May 19, 1955, Serial No. 509,509

3 Claims. (Cl. 74—665)

The present invention relates to a novel reduction gearing unit, and more particularly to a novel skew axis reduction gearing unit.

An important object of the present invention is to provide a novel skew axis reduction gearing unit including a plurality of concentric gear sections respectively driven by a plurality of worms, which gear sections and worms are constructed and arranged with respect to each other so as to provide a highly compact unit having a relatively high reduction ratio.

Another object of this invention is to provide a skew axis gearing unit of the above described type wherein the worms may be relatively easily positioned in proper meshing relationship with their associated worm gears.

Another object of the present invention is to provide a novel compact skew axis reduction gearing unit including a plurality of gear sections driven by a plurality of worms, which unit is highly efficient in operation, and is capable of transmitting a relatively great amount of power for its size.

Still another object of the present invention is to provide a novel skew axis reduction gearing unit including a plurality of worm gear and worm sets wherein one worm and gear set may be adjusted relative to another worm and gear set so that one set "irons out" or eliminates any errors in the other set when the sets are run together.

Other objects and advantages of the present invention will become apparent from the following description and the accompanying drawings wherein:

Fig. 5 is a partial sectional view taken along line 5—5 in Fig. 6 showing another modified form of the present invention;

Fig. 6 is a partial sectional view taken along line 6—6 in Fig. 5; and

Figures 1, 2:
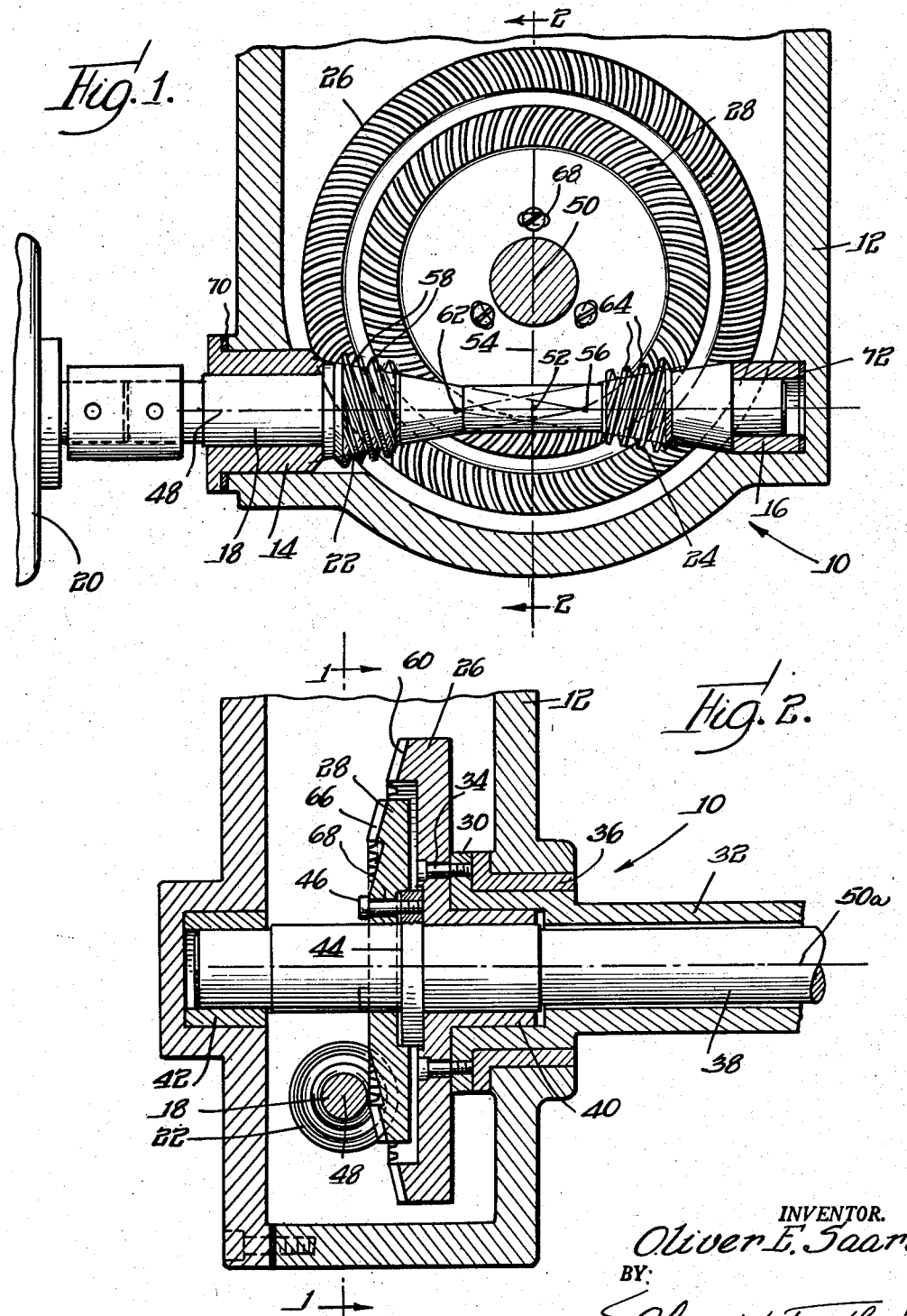
Fig. 1 is a sectional view taken along line 1—1 in Fig. 2 and shows a reduction gearing unit embodying one form of the present invention.
Fig. 2 is a sectional view taken along line 2—2 in Fig. 1.

There are many machines and appliances wherein it is desired to drive a plurality of concentric and telescopically associated shafts, and in accordance with the present invention, this may be accomplished with a gearing unit such as the gearing unit 10 shown in Figs. 1 and 2. The unit 10 includes a housing 12 having bearings 14 and 16 mounted in opposite walls thereof for rotatably supporting a drive shaft 18. The shaft 18 extends from the housing and may be driven by any suitable means such as a motor 20. The shaft 18 carries a pair of axially spaced worms 22 and 24 hereinafter more fully described, which worms respectively mesh with face type worm gears 26 and 28. The gear 26 is secured to an end flange 30 of a hollow driven shaft 32 by a plurality of screws 34. The shaft 32 is journalled in a bearing 36 mounted in a wall of the housing 12. Extending through the hollow shaft 32 is a second shaft 38 to be driven, which shaft 38 is journalled by a hub portion 40 of the gear 26 and a bearing 42 mounted in the housing. The gear 28 is secured to a flange 44 on the shaft 38 by a plurality of screws 46.

The axes of rotation 48 and 50 of the worms and worm gears respectively are skew axes or in other words, they are non-parallel and non-intersecting. It should be noted that the worm shaft 48 is arranged so that the distance between the axis 50 and a point 52 at which line 54 in a plane coincident with the axis 50 and perpendicular to the axis 48 intersects the axis 18 is less than the radii of the worm gears 26 and 28. In addition, it should be noted that the worms 22 and 24 are frustums of cones having only a moderate taper. The worm 22 is positioned at the left of the line 54 as viewed in Fig. 1 and tapers so that the point 56 of a projected cone coincident with the roots of threads 58 on the worm 22 lies on the axis 48 at the right side of the line 54. The worm 22 may be provided with a single or multiple start threads, which threads have a plurality of complete convolutions and are right-hand threads adapted to mate with teeth 60 on the gear 26. Thus, the worm 22 serves to drive the gear 26 in a counterclockwise direction as viewed in Fig. 1.

The worm 24 is similar to the worm 22 in that it is formed so that the point 62 of a projected cone coincident with the roots of its threads 64 lies on the axis 48 at a side of the line 54 opposite from the worm 24. The threads 64 also have a plurality of complete convolutions and may be either single or multiple start threads. These threads are left-hand threads and are adapted to engage teeth 66 on the gear 28 for driving the gear 28 in a clockwise direction.

Preferably, the worms and gear sections are formed so as to provide a relatively high reduction ratio such for example, as a reduction ratio of at least 9 to 1. The worm and gear sets may be constructed so that they have either the same or different reduction ratios. For certain installations, the outer or larger diameter worm and gear set may have a higher reduction ratio, but it should be particularly noted that the inner or smaller diameter worm and gear set may be constructed so as to have a higher reduction ratio than the outer worm and gear set, if desired.

Reference is hereby made to my Patent 2,696,125 dated December 7, 1954 for a complete disclosure relating to the shape of the worm threads and the gear teeth. It suffices to state herein that the worm threads have a constant axial lead and are of uniform cross sectional shape throughout their lengths and are formed to mate with gear teeth having a substantially ideal cross sectional shape throughout their lengths, or in other words, having no appreciable inoperative fillets or undercuts. In addition to permitting the provision of high reduction ratios, such worms and gears have several advantages including the ability to transmit relatively great amounts of power as a result of the large area of contact between the thread and the gear teeth, and in that the worms and gears may be economically manufactured.

With the structure described above, some error is permissible in locating the worm and worm gear shafts relative to each other since the worms may be brought into proper meshing engagement with their associated worm gears by mounting them on the shaft 18 so that they are axially or rotatably adjustable relative to each other, or if desired, the worm gears may be mounted for rotative adjustment relative to each other. More specifically, in the embodiment illustrative in Figs. 1 and 2, the worm gear 28 is made adjustable relative to the worm gear 26 by forming the apertures 68 through which the screws 46 extend overside or as arcuate slots so that upon loosening of the screws 46, the gear 28 may be rotated to a desired adjusted position relative to the gear 26. After this has been accomplished, the gear 28 is again locked with respect to the shaft 38 by tightening the screws. With this structure the worm may be assembled with the gears by first locating the worm shaft 48 by means of the bearings 14 and 16 and shims 70 and 72 so that the threads 58 on the worm 22 mesh properly with the teeth 60 on the gear 26. Then the gear 28 may be adjusted in the manner just described relative to the gear 26 until the teeth 66 properly mesh with the threads 64. In this way both worm and gear sets may be easily brought into proper meshing relationship. Furthermore, after the gears have been run for a period of time any adjustment made necessary as a result of wear or any other reason may be easily made to insure proper operation.

Figure 3:
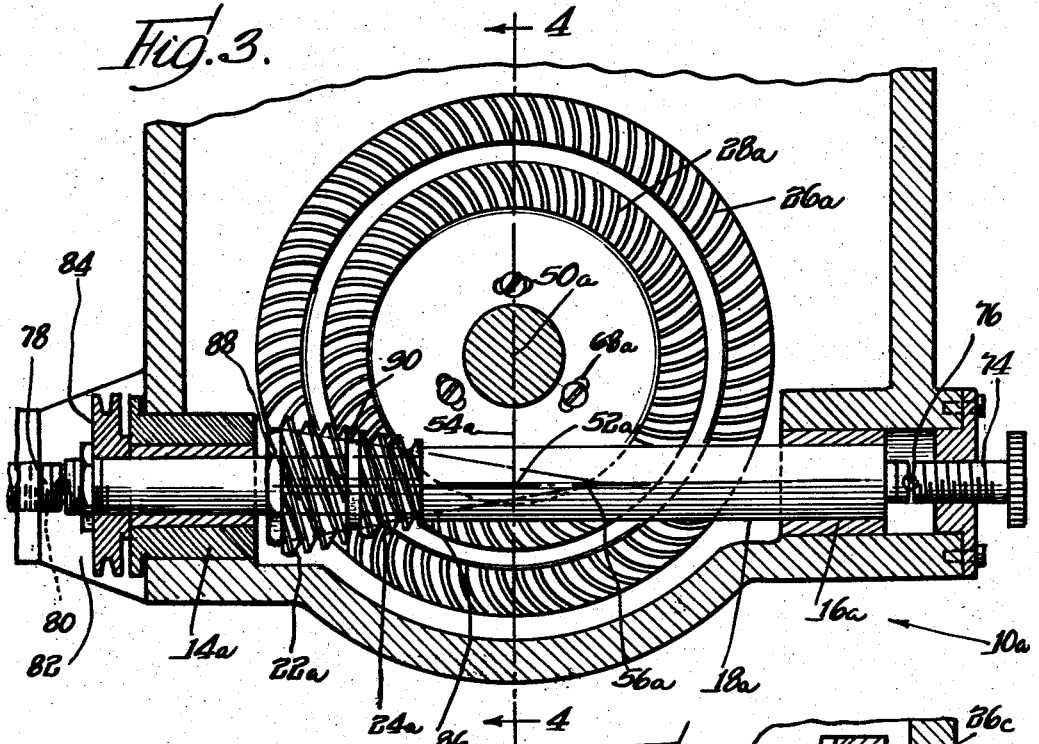
Fig. 3 is a fragmentary sectional view showing a reduction gearing unit embodying another form of the present invention.
Figures 4, 7:
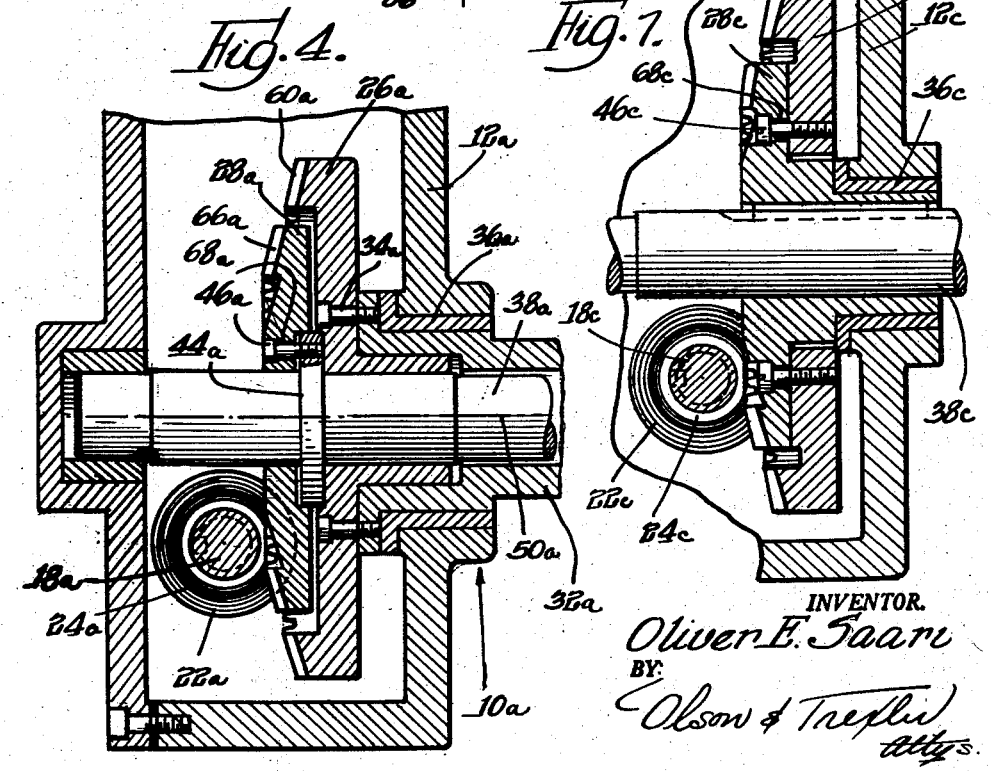
Fig. 4 is a sectional view taken along line 4—4 in Fig. 3.
Fig. 7 is a fragmentary sectional view showing another embodiment wherein the worm gear sections are interconnected.

In Figs. 3 and 4 there is shown a modified form of the present invention which is similar to the above described structure as indicated by the application of identical reference numerals with the suffix "a" added to corresponding elements. This embodiment differs in that the worm 24a is disposed at the same side of the line 54a as the worm 22a and is also provided with right-hand threads. As a result, this structure is adapted to drive the worm gears 26a and 28a in the same direction. Furthermore, in this embodiment the worms are mounted so that they may be easily adjusted axially and also rotatably adjusted relative to each other. In order to obtain axial adjustment, a positioning screw 74 is threaded into the housing and supports a bearing 76 for locating the right-hand end of the worm shaft 18a, and a similar positioning screws 78 carrying a bearing 80 is threaded through a bracket 82 for engaging the left-hand end of the worm shaft. Any suitable motor drive means including a pulley 84 may be provided for driving the shaft 18a. The worms 22a and 24a are clamped between a shoulder 86 on the worm shaft and a nut member 88 threaded onto the shaft so that they are normally locked against relative rotation with respect to each other and the shaft. However, upon loosening of the nut the worms may be rotated and adjusted relative to each other. Preferably, the worms are axially separated by a shim 90, and it will be appreciated that the worms may be adjusted axially relative to each other by changing the thickness of the shim. It should also be understood that, if desired, the worm gears 26a and 28a may also be mounted so that they may be rotatively adjusted relative to each other in a manner similar to the above described worm gears, and in addition, the above described worms 22 and 24 may be mounted so that they may be adjusted axially and rotatively relative to each other in a manner similar to the worms 22a and 24a.

In Figs. 5 and 6 there is shown a gearing unit 10b wherein the elements corresponding to the elements of the above described embodiments are indicated by identical reference numerals with the suffix "b" added. The worm 22b and its associated worm gear 26b are essentially identical to the corresponding elements of the above described structures. However, in this embodiment the worm 24b is of any known type capable of meshing with teeth spaced about the periphery of the worm gear 28b. As pointed out in the above mentioned Patent 2,696,125, the tapered worm and face-type gear contemplated herein should not be used when the gear ratio is to be less than about 9. Therefore, the structure shown in Figs. 5 and 6 may be used to advantage when it is desired to have the gear ratio of the worm 24b and gear 28b less than 9.

As shown, the gearing unit of Figs. 5 and 6 is adapted to drive concentric shafts 32b and 38b which extend oppositely from each other. However, it is understood that these shafts may be telescopically associated in a manner similar to the shaft described above. Furthermore, in this embodiment the gearing unit is provided with clutch means so that the shaft 32b and 38b may be selectively driven. More specifically, the hub of the worm gear 28b which is freely rotatably disposed on the shaft 38b is provided with clutch teeth 92 adapted to interengage with teeth 94 on a clutch member 96 axially slidable on the shaft 38b but retained against rotation relative to the shaft by a key 98. Similarly, the gear 26b which is freely rotatable on the shaft 32b is provided with clutch teeth 100 adapted to interengage with clutch teeth 102 on an axially slidable clutch member 104. A key 106 is provided for preventing relative rotation between the clutch member 104 and the shaft 32b. Any suitable means including a lever 108 pivotally mounted as at 110 is provided for shifting the clutch member 96 into and out of engagement with the gear 28b, which lever has a bifurcated end portion 112 carrying pins 114 projecting into an annular slot 116 in the clutch member. A similar suitably operated lever 118 is provided for shifting the clutch member 104 into and out of engagement with the gear 26b. In some instances, it may be desirable to modify the structures described so that the worm and gear sets may be utilized to drive a single shaft. This may be accomplished by rigidily interconnecting the shafts 32b and 38b or by replacing these shafts with a single shaft. It is, of course, understood that the worms shown in Figs. 5 and 6 may be mounted for axial and rotative adjustment relative to each other in a manner similar to that described above in connection with the embodiment of Figs. 3 and 4.

In Fig. 7 wherein elements corresponding to those described above are designated by the same reference numerals with the suffix "c" added, there is shown a unit similar to the gearing unit of Figs. 3 and 4 except that the gear sections are fixed together on a single shaft and are adapted to be driven in unison. Of course, the two worm and gear sets of this embodiment are constructed so as to have the same reduction ratio. In order to facilitate proper meshing and adjustment of the worms 22c and 24c with respect to the gear sections, adjustable mounting means similar to that shown in Figs. 3 and 4 is provided, and the gear section 28c may be adjustably secured to the gear section 26c by screws 46c extending through slots 68c and threaded into the gear 26c. With the driven gears as well as the driving worms locked together as in this embodiment, each gear set serves as a control for the other so that one set "irons out" or eliminates any errors in the other set.

From the above description it is seen that the present invention has provided a novel skew axis reduction gearing unit including a plurality of concentric worm gear sections and a plurality of worms rotatable about aligned axes in a common plane so that the unit is very compact while still providing a high reduction ratio. It is also seen that this invention has provided a skew axis reduction gearing unit of compact construction which is capable of driving gear sections either in the same or in the oppositely directions and either at the same or at widely different speeds. Furthermore, it will be appreciated that with a novel gearing unit of the present invention, large amounts of power may be transmitted to the driven shafts without unduly increasing the size of the unit. In addition, it is seen that the worm and gear sets may be adjusted so that each serves to eliminate any errors in the other.

While the preferred embodiments of the present invention have been shown and described herein, it is obvious that many structural details may be changed without departing from the spirit and scope of the appended claims.

The invention is claimed as follows:

1. A reduction gearing unit comprising a rotatably mounted relatively large face-type worm gear, a second and relatively smaller similar face-type worm gear concentric with the relatively large worm gear, a power input shaft, a first worm fixed on said power input shaft and meshing with said relatively large worm gear and in skew axis relation thereto, said first worm being of uniform lead and having a rectilinear taper, a second worm fixed on said power input shaft for rotation coaxial with said first worm and meshing with the smaller worm gear, said second worm being of uniform lead and having a rectilinear taper, said second worm and smaller worm gear being in skew axis relation, the common perpendicular to the worm axis and the gear axis being shorter than the radius of the larger worm gear, said first and second worms being axially spaced apart a substantial distance to engage said first and second worm gears in different quadrants thereof, the taper of said first and second worms being relatively reversed, and means mounting the first and second worm gears for relative rotation so that the first and second gears rotate in relatively opposite directions.

2. A reduction gearing unit comprising a rotatably mounted relatively large face-type worm gear, a second and relatively smaller similar face-type worm gear concentric with the relatively large worm gear, a first worm meshing with said relatively large worm gear and in skew axis relation thereto, said first worm being of uniform lead and having a rectilinear taper, a second worm fixed for rotation coaxial with said first worm and meshing with the smaller worm gear, said second worm being of uniform lead and having a rectilinear taper, said second worm and smaller worm gear being in skew axis relation, the common perpendicular to the worm axis and the gear axis being shorter than the radius of the larger worm gear, said first and second worms being axially spaced apart a substantial distance to engage said first and second worm gears in different quadrants thereof, the taper of said first and second worms being relatively reversed, and means mounting the first and second worm gears for relative rotation so that the first and second gears rotate in relatively opposite directions.

3. A reduction gearing unit comprising a rotatably mounted relatively large worm gear, a second and relatively smaller worm gear concentric with the relatively large worm gear a power input shaft traversing the faces of said first and second worm gears, means affording endwise adjustment of said power input shaft, a first worm fixed on said power input shaft and meshing with said relatively large worm gear in skew axis relation thereto, said first worm being of uniform lead and having a rectilinear taper, and a second worm fixed on said power input shaft for rotation coaxial with said first worm and meshing with the smaller worm gear, said second worm and smaller worm gear being in skew axis relation, the common perpendicular to the worm axis and the gear axis being shorter than the radius of the larger worm gear, said first and second worms being axially spaced apart a substantial distance to engage said first and second worm gears in different quadrants thereof.

References Cited in the file of this patent
UNITED STATES PATENTS

| | | |
|---|---|---|
| 283,079 | Conradson | Aug. 14, 1883 |
| 1,323,282 | Horton | Dec. 2, 1919 |
| 1,848,342 | Gleason | Mar. 8, 1932 |
| 2,028,148 | Elbertz | Jan. 21, 1936 |
| 2,418,555 | Kirsten | Apr. 8, 1947 |
| 2,696,125 | Saari | Dec. 7, 1954 |